United States Patent
Ralphs

(10) Patent No.: US 8,713,782 B1
(45) Date of Patent: May 6, 2014

(54) SECURING IRRIGATION HOSE ENDS WITH CRIMP RING AND CRIMP TOOL

(71) Applicant: Beau Ralphs, Phoenix, AZ (US)

(72) Inventor: Beau Ralphs, Phoenix, AZ (US)

( * ) Notice: Subject to any disclaimer, the term of this patent is extended or adjusted under 35 U.S.C. 154(b) by 0 days.

(21) Appl. No.: 13/761,015

(22) Filed: Feb. 6, 2013

(51) Int. Cl.
*B21D 39/00* (2006.01)
*B23P 11/00* (2006.01)

(52) U.S. Cl.
USPC ............ 29/508; 29/516; 29/525.05; 29/280; 29/282; 29/268; 285/237

(58) Field of Classification Search
USPC ............ 29/506, 508, 516, 517, 525.06, 268, 29/278, 237, 525.05, 280, 282; 425/318; 285/236, 237, 242, 256
See application file for complete search history.

(56) References Cited

U.S. PATENT DOCUMENTS

| | | | |
|---|---|---|---|
| 1,509,802 A | 9/1924 | Weigand | |
| 2,253,691 A | 8/1941 | Darling | |
| 2,314,236 A * | 3/1943 | Mott | 285/256 |
| 2,319,024 A * | 5/1943 | Wehringer | 285/256 |
| 2,614,304 A * | 10/1952 | Oetiker | 24/20 R |
| 2,786,095 A * | 3/1957 | Arbeiter | 174/88 C |
| 3,791,189 A | 2/1974 | Lawson | |
| 4,293,147 A * | 10/1981 | Metcalfe et al. | 285/39 |
| 4,990,106 A * | 2/1991 | Szegda | 439/585 |
| 6,050,608 A * | 4/2000 | Hattori et al. | 285/39 |
| 6,523,862 B1 * | 2/2003 | MacDuff | 285/256 |
| 8,123,257 B1 | 2/2012 | Baer et al. | |
| 8,191,226 B2 * | 6/2012 | Avnon | 29/525 |
| 8,241,029 B2 | 8/2012 | Kidd | |
| 2010/0156097 A1 | 6/2010 | Steiner | |

FOREIGN PATENT DOCUMENTS

WO    WO 2008012811 A2 *  1/2008

* cited by examiner

*Primary Examiner* — Jermie Cozart
(74) *Attorney, Agent, or Firm* — Benjamin D. Tietgen; Quarles & Brady LLP

(57) ABSTRACT

A method, apparatus, and kit for reinforcing the distal end of a lateral in an irrigation system, typically in which the distal end of the lateral receives a head with a barbed neck. The method includes placing a crimp ring around the lateral, the crimp ring being large enough to encircle a bulge in the lateral created by insertion of the barbed neck into the end of the lateral. The crimp ring is positioned over the bulge and compressed to sheath and reinforce the bulge. The compression imparts a longitudinally convex profile upon the crimp ring, reducing its inner and outer diameters without increasing its length. This compression may cause projections, made of material from the crimp ring, to form on the outer surface of the crimp ring. A kit includes a crimp tool having a crimp die shaped to impart the longitudinally convex shape upon the crimp ring.

18 Claims, 6 Drawing Sheets

SECURING IRRIGATION HOSE ENDS WITH CRIMP RING AND CRIMP TOOL

FIELD OF INVENTION

This invention relates to micro irrigation systems. This invention relates particularly to a method and apparatus for securing an emitter to a lateral hose end.

BACKGROUND

Micro irrigation systems, such as drip- or trickle-irrigation systems, deliver water to plants in a localized area, such as a small field, greenhouse, or residential yard. A typical system comprises a rigid supply pipe or flexible supply hose attached to a water source, with multiple smaller, flexible hoses, called "laterals," extending from the supply pipe or hose. The laterals carry water from the supply pipe or hose to the plants to be watered, and may be perforated or equipped with emitters at intervals along their length. A "head," which is an emitter or a simple plug, is attached to the distal end of the lateral. The heads of all laterals must be properly attached to maintain pressure within the system and prevent large amounts of water waste.

The most widely used heads are "barbed" for attachment to the lateral. A barbed head has a cylindrical neck with a diameter that is equal to or slightly smaller than the inner diameter of the lateral. The neck has projections, typically triangular in cross-section, that are configured to allow a user to push the neck into the end of the lateral but prevent the opposite motion. The barbs "bite" into the inner surface of the lateral to create a watertight connection. Unfortunately, the barbed head compromises the integrity of the lateral's end immediately upon insertion by stretching and then scoring the material.

With overwhelming frequency, the first component to fail in micro irrigation systems is the lateral, wherein the end wears out quickly and develops leaks or loses its connection with the head. The end of the lateral typically sticks above ground and is thus exposed to the elements. As the temperature changes, the material expands and contracts around the barbs, and the damage to the inner surface spreads. Because barbed heads are ubiquitous in the field, it would be advantageous to reinforce the end of the lateral to prevent premature failure. It would further be advantageous to also tighten the connection of the head to the lateral and insulate the lateral from the environment.

Therefore, it is an object of this invention to improve micro irrigation systems by providing a device that attaches to the end of a lateral to reinforce the lateral and secure a barbed head to the lateral. It is a further object that the device be low cost and simple to attach. It is a further object to provide a tool for attaching the inventive device. It is another object of this invention to provide a method of reinforcing the ends of laterals in a micro irrigation system.

SUMMARY OF THE INVENTION

This invention is a crimp ring and crimp tool adapted to crimp the crimp ring at the end of a lateral around the neck of a barbed head. The crimp ring is annular, having a uniform diameter and thickness and a length that is sufficient to encircle the length of the lateral that is in contact with the head. The crimp ring is made of a malleable, weather-resistant metal, preferably copper. The crimp tool comprises a set of jaws with corresponding recesses that form a crimp die for receiving the crimp ring. The jaws may be squeezed together by a lever action, compressing the crimp ring to the desired diameter. The crimp die is shaped to retain the circular cross-section and length of the crimp ring, but to depress the ends of the crimp ring slightly more than the center to give the crimped ring a longitudinally arcuate shape. The crimped ring has a main body and one or more projecting parts comprising compressed material. The crimp tool may be a standalone tool having a set of plier-like grips for compressing the tool, or it may be a toolhead attachment that attaches to a set of grips.

To reinforce the end of the lateral and secure the connection between lateral and head, the crimp ring is first slid over the end of the lateral onto the main portion of the lateral. Then, the neck of the barbed head is inserted into the end of the lateral, creating a bulge in the end of the lateral. The crimp ring, which is wide enough to fit over the bulge, is slid over the bulge up to the edge of the lateral. The crimp tool is placed over the crimp ring and closed so that the crimp ring is aligned within the crimp die. The grips are squeezed to compress the crimp ring. After compression, the crimp ring fits tightly around the end of the lateral and conforms to the shape of the bulge. The arcuate longitudinal cross-section of the compressed crimp ring provides uniform reinforcement around the circumference of the lateral. The projecting parts provide a visual indicator that the crimp ring was successfully crimped.

DETAILED DESCRIPTION OF THE INVENTION

Figure 1:
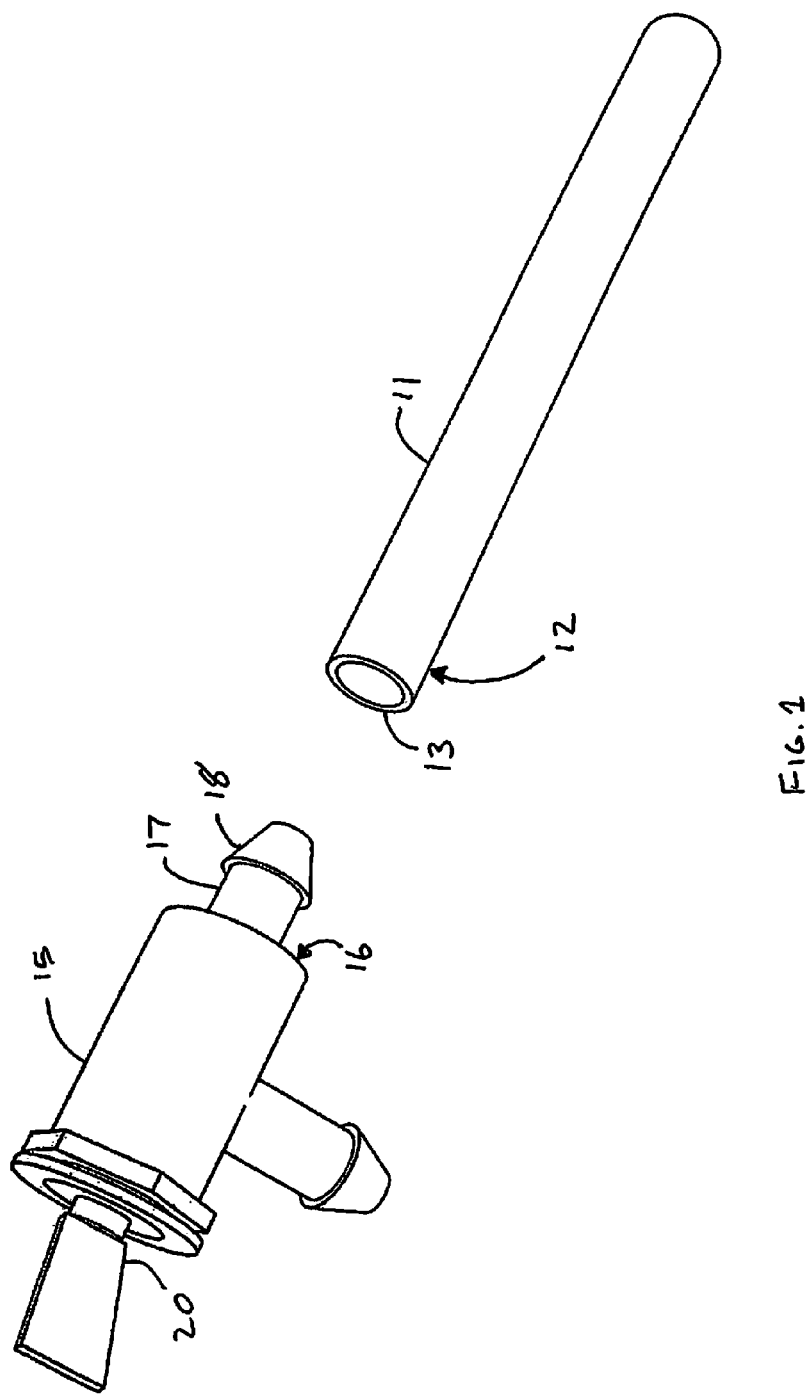
FIG. 1 is an exploded top perspective view of components of an irrigation system.
Figure 2:
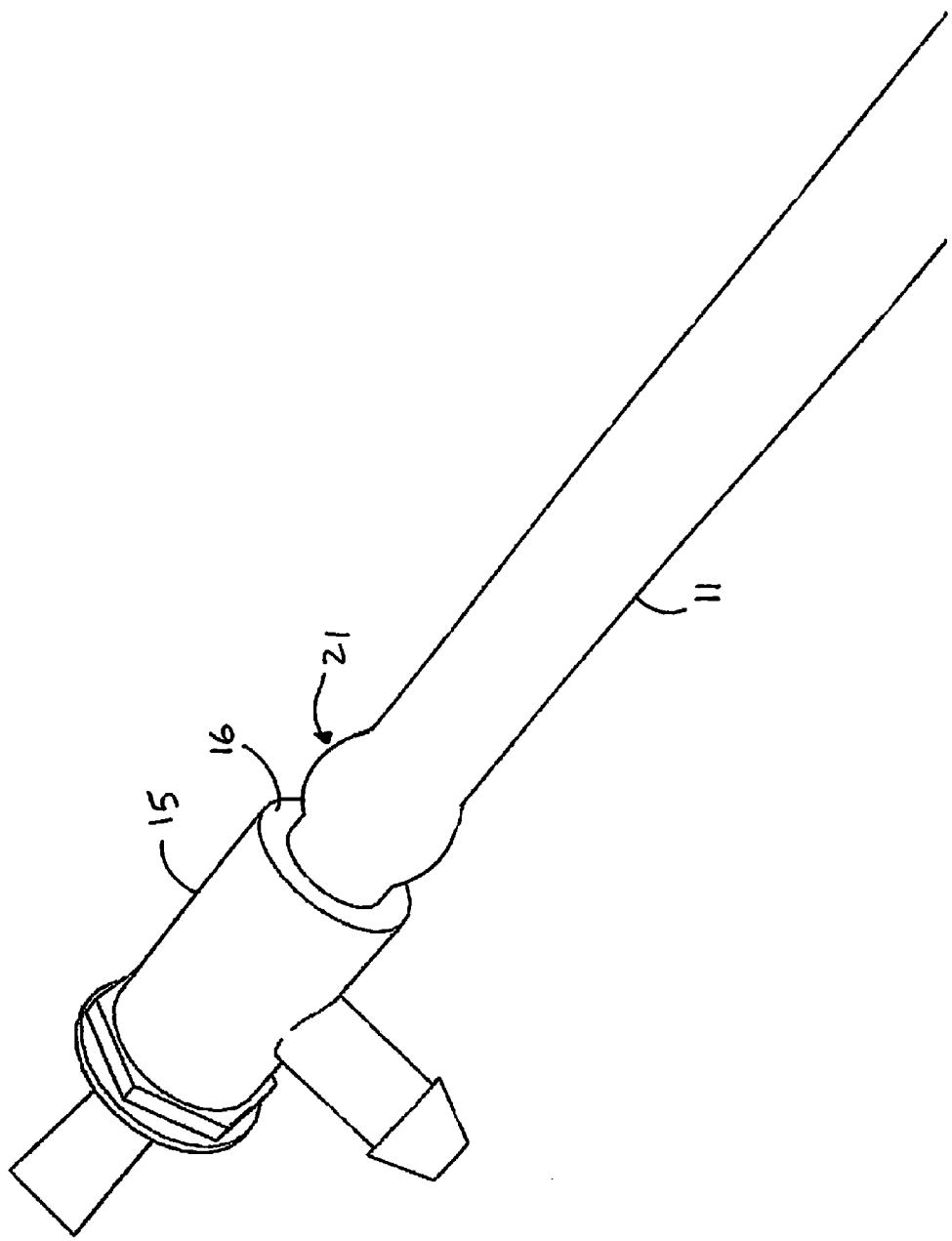
FIG. 2 is a bottom perspective view of the components of FIG. 1.

FIGS. 1 and 2 illustrate the components of a micro irrigation system on which the present invention operates. A lateral 11 is a section of non-metallic, typically cross-linked polyethylene, flexible tubing that carries water from the supply line at its proximal end (not shown) to its distal end 12. The lateral 11 may have an outer diameter of about 0.25 inches. A head 15, which is preferably a barbed head as illustrated, comprises an elongated base 16 and a neck 17 attached to or integral with the base and extending distally from the base 16. The head 15 may be a simple plug or may further comprise an emitter 20 that ejects water delivered to the head 15 under pressure. The neck 17 may comprise one or more barbs 18, which are discrete expanded portions of the neck 17 spaced longitudinally along the neck 17. The barbs 18 may have a triangular cross-section as illustrated, or may have any other shape known in the art, such as a rectangular cross-section. The barbs 18 may all be the same size, or may gradually increase or decrease in size according to their proximity to the base 16. The head 15 attaches to the lateral 11 by inserting the neck 17 into the lateral 11. This expands the tubing and leaves a bulge 21 at the distal end 12.

Figure 3:
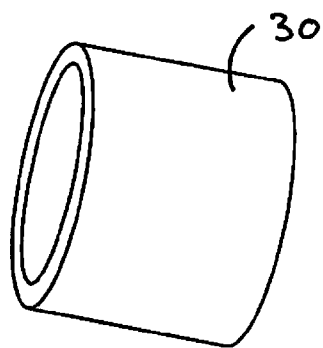
FIG. 3 is a perspective view of the preferred embodiment of a crimp ring.
Figure 4:
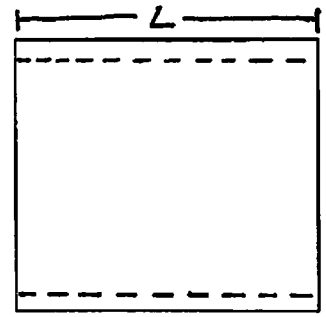
FIG. 4 is a right side view of the crimp ring of FIG. 3.
Figure 5:
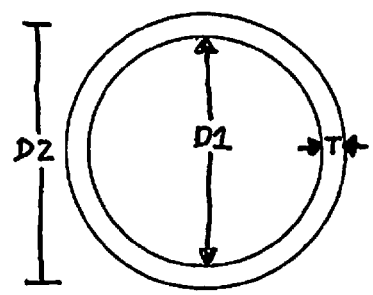
FIG. 5 is a front view of the crimp ring of FIG. 3.

Referring to FIGS. 3-5, the present invention includes a crimp ring 30. The crimp ring 30 is substantially cylindrical, preferably having a uniform thickness T, and therefore a uniform inner diameter D1 and outer diameter D2, along its length L. The dimensions of the crimp ring 30 may be chosen depending on the sizes of the lateral 11 to be crimped and the neck 17 of the head 15 inserted therein. Preferably, the inner diameter D1 is slightly larger than the diameter of the bulge 21, and the length L is about equal to the length of the bulge 21. In one example, a crimp ring 30 used on a ¼ inch lateral 11 and a standard polyvinyl chloride drip valve has an inner diameter D1 of 0.275 inch, an outer diameter D2 of 0.320 inch, and a length L of about 0.300 inch. The crimp ring 30 may be made of any weather- and water-resistant, substantially malleable metal. In the preferred embodiment, the crimp ring 30 is made of copper for its properties of corrosion resistance, its malleability, and its low cost. The higher the purity of copper, the longer the crimp ring 30 will last in the field, so preferably the copper is at least about 99.6% pure. The thickness T, which is about 0.045 inch in the preferred embodiment, is selected to allow the material of the crimp ring 30 to spread outward from the cylindrical part when the crimp ring 30 is crimped as described below.

Figure 6:
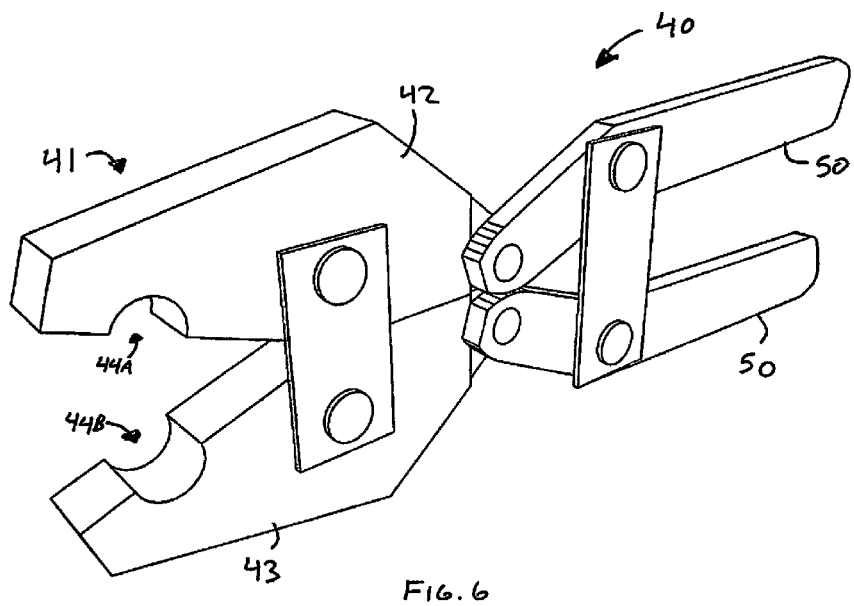
FIG. 6 is a perspective view of a crimp tool in accordance with the invention.
Figure 7:
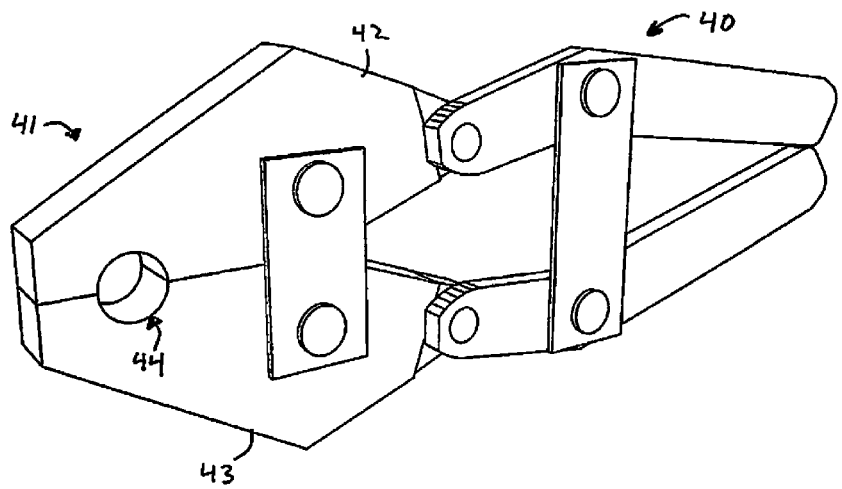
FIG. 7 is a perspective view of the crimp tool of FIG. 6 showing the crimp die.
Figure 8:
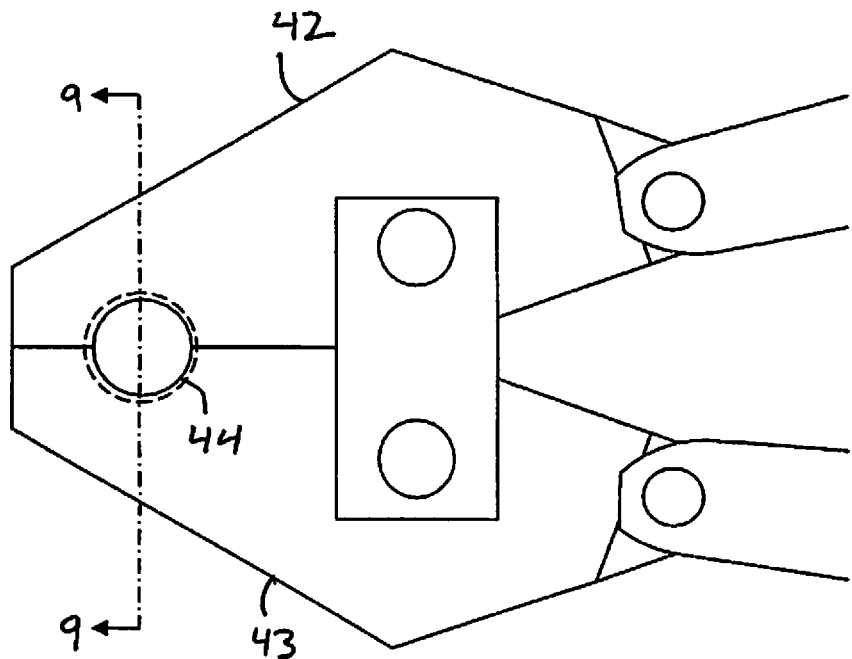
FIG. 8 is a side view of the crimp tool head of FIG. 6.
Figure 9:
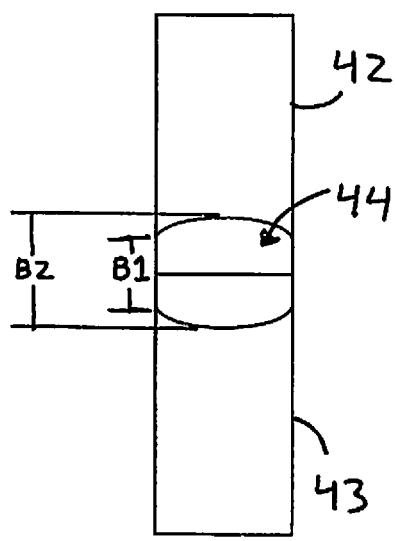
FIG. 9 is a cross-sectional rear view of the crimp tool die of FIG. 8.

Referring to FIGS. 6-9, the present invention further includes a crimp tool 40. The crimp tool 40 comprises a head 41 which includes cooperating first and second jaws 42, 43. As is known in the art of crimp tools, the jaws 42, 43 have recesses 44A, 44B formed into their opposing faces. When the jaws 42, 43 close together as shown in FIG. 6, the recesses 44A, 44B align to form a crimp die 44 that imparts the preferred shape onto a crimp ring. The crimp die 44 is a cylindrical bore having a first bore diameter B1 at the proximal and distal ends, and a second, larger bore diameter B2 in the middle of the bore. The crimp die 44 thus has a convex longitudinal cross-sectional shape. See FIG. 9. The first bore diameter B1 is approximately equal to the sum of the lateral's 11 diameter and the thickness T of the crimp ring 30. The second bore diameter B2 is approximately equal to the sum of the crimp ring 30 thickness T and the lateral's 11 diameter at the widest part of the bulge 21. The recesses 44A, 44B are preferably identically shaped for ease of manufacture of the tool. The head 41 may be attached to or integral with a set of plier-like grips 50 in any manner known in the art. For example, each jaw 42, 43 may be integral with one of the grips 50 as in a standard pair of pliers. In another example, the head 41 may be configured to attach to a discrete set of grips 50 that is configured to receive interchangeable tool heads for varying purposes.

Figure 10:
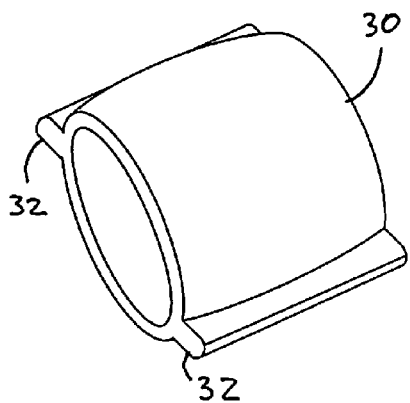
FIG. 10 is a perspective view of the preferred crimp ring after crimping.
Figure 11:
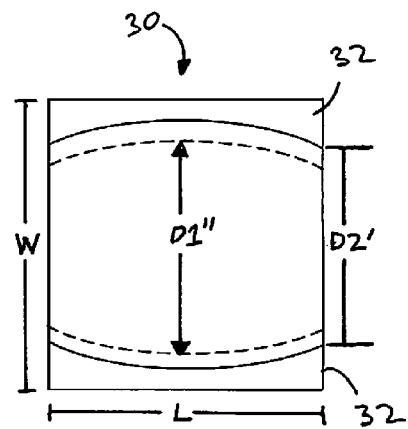
FIG. 11 is a right side view of the crimp ring of FIG. 10.
Figure 12:
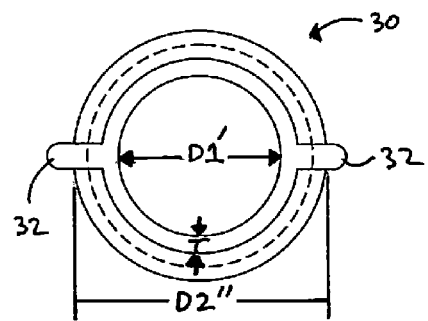
FIG. 12 is a front view of the crimp ring of FIG. 10.

Referring to FIGS. 10-12, the crimp tool 40 and crimp ring 30 may be used together to reinforce the bulge 21 in a lateral 11, retaining the head 15 in place on the lateral 11 and increasing the useful life of the lateral 11. The crimp ring 30 is first slid over the distal end 12 onto the lateral 11. Then the head 15 is attached by inserting the neck 17 into the distal end 12 of the lateral 11 until the base 16 of the head 15 abuts the edge 13 of the lateral 11. This creates the bulge 21 where the barbs 18 expand the diameter of the lateral 11. The crimp ring 30 is slid over the bulge 21. The crimp tool 40, in an opened position, is disposed over the crimp ring 30 and closed so that the recesses 44A, 44B encircle the crimp ring 30. The grips 50 are then squeezed, compressing the crimp ring 30. As the crimp ring 30 is compressed, it undergoes two changes. First, the crimp ring 30 is reduced radially until it conforms to the shape of the crimp die 44. Specifically, the crimp die 44 imparts its longitudinally convex shape on the crimp ring 30. Preferably, the crimped crimp ring 30 has a first inner diameter D1' of about 0.222 inch and a first outer diameter D2' of about 0.267 inch at its proximal and distal ends, and a second inner diameter D1" of about 0.243 inch and a second outer diameter D2" of about 0.288 inch at its midpoint. The thickness T is preferably unchanged or compressed by only 0.005 inch or less after crimping. The compressed crimp ring 30 will conform to the bulge 21 without significantly compressing the lateral 11 or the neck 17. Thus, the crimp ring 30 reinforces the distal end 12 of the lateral 11 without affecting water flow through the lateral 11 or head 15.

Second, as the crimp ring's 30 diameter is reduced, it is desirable to maintain its length L so that only the bulge 21 is sheathed by the crimped crimp ring 30. To allow this, the thickness T and composition of the crimp ring 30 allows a discrete amount of the crimp ring material 30 to be extruded normally under compression from the crimp tool 40, creating one or more projections 32 extending outward from the body 31 of the crimp ring 30. The projections 32 may be formed by leaving a space for the projections in the crimp die 44. Preferably, however, the compression forces naturally produce two projections 32 along the opposing faces of the jaws 42, 43 on either side of the body 31 as the crimp ring 30 is compressed within the recesses 44A, 44B. The projections 32 may be a small fraction of an inch wide. Preferably, the overall width W including the projections is about 0.335 inch. The projections 32 allow the diameter but not the length L of the crimp ring 30 to be reduced. Furthermore, the projections 32 provide a visual indicator that the crimp ring 30 has been properly crimped.

When the crimp tool 40 is fully compressed, the crimp ring 30 is in its final form and the crimp tool 40 may be opened and removed. The crimp ring 30 reinforces the most weather- and age-susceptible part of the lateral 11, which is the distal end 12 that is attached to the head 15. By fully encircling the bulge 21 from the exterior with a copper ring that conforms to the bulge's 21 shape, the present method protects the lateral 11 from early failure due to the deformation at the distal end 12. The unique shape of the crimped crimp ring 30 does not cut into the lateral 11, does not restrict water flow, and provides uniform support around the complete circumference of the lateral 11.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

What is claimed is:

1. A method of reinforcing a lateral in an irrigation system, at an end of the lateral to which a head is attached, the method comprising:
   a. placing a crimp ring around the lateral, the crimp ring being large enough to encircle a bulge in the lateral created by insertion of a barbed neck on the head into the end of the lateral;
   b. positioning the crimp ring over the bulge; and
   c. using a crimp tool comprising a head having first and second jaws, each of the first and second jaws having a recess, the recesses cooperating to form a crimp die when the first and second jaws close together, to sheath the bulge by compressing the crimp ring in the crimp die into a longitudinally convex shape that substantially conforms to the bulge's shape.

2. The method of claim 1 wherein the crimp ring is made of copper.

3. The method of claim 1 wherein the length of the crimp ring is selected so that only the bulge is sheathed.

4. The method of claim 1 wherein the length of the crimp ring does not change as the crimp ring is compressed.

5. The method of claim 4 wherein the crimp ring has a uniform thickness that does not change as the crimp ring is compressed.

6. The method of claim 4 wherein the crimp ring has uniform inner and outer diameters before compression, and wherein compressing the crimp ring comprises reducing the inner and outer diameters of the crimp ring.

7. The method of claim 6 wherein compressing the crimp ring creates one or more projections extending outward from the crimp ring.

8. The method of claim 1 wherein the crimp die has a concave profile that substantially conforms to the bulge's shape.

9. A method of reinforcing a lateral in an irrigation system, at an end of the lateral to which a head is attached, the method comprising:
   a. placing a copper crimp ring around the lateral, the crimp ring having a length and a uniform inner diameter that is large enough to encircle a bulge in the lateral along the bulge's length, the bulge being created by insertion of a barbed neck on the head into the end of the lateral;
   b. positioning the crimp ring over the bulge; and
   c. using a crimp tool comprising a head having first and second jaws, each of the first and second jaws having a recess, the recesses cooperating to form a crimp die when the first and second jaws close together, to sheath the bulge by compressing the crimp ring in the crimp die into a longitudinally convex shape that substantially conforms to the bulge's shape without compressing the bulge, and causes one or more projections to be formed on the crimp ring from crimp ring material without changing the length of the crimp ring.

10. The method of claim 9 wherein the lateral has an outer diameter of 0.25 inches and the crimp ring has an inner diameter of 0.285 inches, an outer diameter of 0.320 inches, and a length of about 0.300 inches.

11. The method of claim 9 wherein exactly two projections are formed on the crimp ring in diametrically opposed positions.

12. The method of claim 11 wherein the crimp die has a concave profile that substantially conforms to the bulge's shape.

13. A kit for reinforcing a lateral in an irrigation system, at an end of the lateral to which a head is attached, the kit comprising:
   a. a crimp tool comprising a head having first and second jaws, each of the first and second jaws having a recess, the recesses cooperating to form a crimp die when the first and second jaws close together; and
   b. a crimp ring that is large enough to encircle a bulge in the lateral created by insertion of a barbed neck on the head into the end of the lateral;
the crimp ring being compressible by the crimp tool to sheath the bulge without compressing the bulge;
   wherein each of the recesses has a longitudinally concave profile that substantially conforms to the bulge's shape.

14. The kit of claim 13 wherein the head is configured to attach to a pair of grips.

15. The kit of claim 13 wherein the crimp tool further comprises a pair of plier-like grips attached to the head such that squeezing the grips closes the first and second jaws against each other.

16. The kit of claim 13 wherein the crimp ring is copper.

17. The kit of claim 16 wherein the crimp ring has a uniform length, inner diameter, and outer diameter.

18. The kit of claim 17 wherein the lateral has an outer diameter of 0.25 inches and the crimp ring has an inner diameter of 0.285 inches, an outer diameter of 0.320 inches, and a length of about 0.300 inches.

* * * * *